(12) United States Patent  
Wang et al.

(10) Patent No.: US 11,840,154 B2  
(45) Date of Patent: Dec. 12, 2023

(54) ELECTRIC VEHICLE CHARGING MANAGEMENT METHODS AND SYSTEMS

(71) Applicant: Noodoe Group Inc., Wilmington, DE (US)

(72) Inventors: John C. Wang, Taipei (TW); Yi-An Hou, Taipei (TW); En-Yu Shih, Taipei (TW); Chun-Hung Kung, Taipei (TW)

(73) Assignee: NOODOE GROUP INC., Wilmington, DE (US)

( * ) Notice: Subject to any disclaimer, the term of this patent is extended or adjusted under 35 U.S.C. 154(b) by 218 days.

(21) Appl. No.: 17/529,390

(22) Filed: Nov. 18, 2021

(65) Prior Publication Data

US 2022/0274500 A1 Sep. 1, 2022

(30) Foreign Application Priority Data

Feb. 26, 2021 (TW) ................. 110107099

(51) Int. Cl.
| | |
|---|---|
| *B60L 53/63* | (2019.01) |
| *B60L 58/12* | (2019.01) |
| *H02J 13/00* | (2006.01) |
| *H02J 3/32* | (2006.01) |
| *H02J 7/00* | (2006.01) |
| *B60L 55/00* | (2019.01) |

(52) U.S. Cl.
CPC .............. *B60L 53/63* (2019.02); *B60L 55/00* (2019.02); *B60L 58/12* (2019.02); *H02J 3/322* (2020.01); *H02J 7/0013* (2013.01); *H02J 13/00022* (2020.01)

(58) Field of Classification Search
CPC ......... B60L 53/63; B60L 55/00; B60L 58/12; H02J 3/322; H02J 7/0013; H02J 13/00022; H02J 13/00016; H02J 13/00026; H02J 2310/60; H02J 2310/62; H02J 3/14; H02J 7/00712; H02J 2310/48; Y02T 90/16
USPC ........................................................ 320/109
See application file for complete search history.

(56) References Cited

U.S. PATENT DOCUMENTS

2021/0213848 A1 * 7/2021 Sun ........................ B60L 53/63

* cited by examiner

*Primary Examiner* — Paul Dinh
(74) *Attorney, Agent, or Firm* — McClure, Qualey & Rodack, LLP

(57) ABSTRACT

Electric vehicle charging management methods and systems are provided. First, a server receives a candidate charging request respectively from each of candidate charging stations or candidate mobile devices via a network. According to the candidate charging requests, at least one first charging station is selected from the candidate charging stations, and the first charging station is instructed to perform a first charging operation with an upper power limit value. The server sets the candidate charging requests of the candidate charging stations other than that of the first charging station to a pending state. When the first charging status information corresponding to the first charging operation meets an energy management condition, the server selects at least one second charging station from the candidate charging stations according to the candidate charging requests, and instructs the second charging station to perform a second charging operation with the upper power limit value.

13 Claims, 8 Drawing Sheets

ELECTRIC VEHICLE CHARGING MANAGEMENT METHODS AND SYSTEMS

BACKGROUND OF THE INVENTION

Field of the Invention

The disclosure relates generally to charging management methods and systems for electric vehicle charging stations, and, more particularly to charging management methods and systems that can dynamically allocate power output based on the charging demand in a charging field.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Most of the power facility in the field has already been constructed. It is expensive to update the power facility, such as the capacity of the electric panel, and the construction time is very time-consuming. Generally, the number of electric vehicle charging stations that can be installed in a single charging field is limited by the existing maximum load capacity of the existing field. Therefore, in the case of limited electric vehicle charging stations, the driver of an electric vehicle may have to wait time because the charging station is in use, or need to find other nearby charging stations for charging operations, which causes inconvenience in use, and reduces the willingness to adopt electric vehicles.

Therefore, under the premise of not updating the power facility, some charging sites can implement load adjustment operation to increase the number of electric vehicle charging stations that can be installed in the field. In the load adjustment operation, more electric vehicles can be charged in this charging field at the same time by reducing the power output of respective electric vehicle charging stations.

It is understood that, since the conventional load adjustment operation reduces the power output of the respective electric vehicle charging stations, the average time for all electric vehicles to complete charging will become longer. The prolonged charging time also often causes electric vehicle owners to be dissatisfied with load adjustment operations. On the other hand, since the attributes of users served by each charging field may be different, the charging habits and situations generated by them may also be different. Conventional load adjustment operations may be not applicable to some charging fields, and may even reduce the satisfaction of users for charging.

BRIEF SUMMARY OF THE INVENTION

In an electric vehicle charging management method for use in a charging field with a plurality of electric vehicle charging stations, and the electric vehicle charging stations are connected to a server through a network. First, the server receives a candidate charging request respectively from each of a plurality of candidate charging stations among the electric vehicle charging stations or candidate mobile devices via the network. According to the candidate charging requests, at least one first charging station is selected from the candidate charging stations, and the first charging station is instructed to perform a first charging operation, wherein the at least one first charging station has an upper power limit value, and the at least one first charging station uses the upper power limit value as a target power parameter value to output power to an electric vehicle in the first charging operation. The server sets the candidate charging requests of the candidate charging stations other than that of the first charging station to a pending state. The server continuously obtains first charging status information corresponding to the first charging operation from the at least one first charging station via the network, wherein the first charging status information comprises at least a charging time or a charging power which is charged by the electric vehicle. The server determines whether the first charging status information corresponding to the first charging operation meets an energy management condition. When the first charging status information corresponding to the first charging operation meets the energy management condition, the server selects at least one second charging station from the candidate charging stations according to the candidate charging requests, and instructs the second charging station to perform a second charging operation, wherein the at least one second charging station uses the upper power limit value as the target power parameter value to output power to an electric vehicle in the second charging operation.

An embodiment of an electric vehicle charging management system for use in a charging field comprises a plurality of electric vehicle charging stations and a server. Each of the electric vehicle charging stations has a network connection capability. The server receives a candidate charging request respectively from each of a plurality of candidate charging stations among the electric vehicle charging stations or candidate mobile devices via a network. According to the candidate charging requests, the server selects at least one first charging station from the candidate charging stations, and instructs the first charging station to perform a first charging operation, wherein the at least one first charging station has an upper power limit value, and the at least one first charging station uses the upper power limit value as a target power parameter value to output power to an electric vehicle in the first charging operation. The server sets the candidate charging requests of the candidate charging stations other than that of the first charging station to a pending state. The server continuously obtains first charging status information corresponding to the first charging operation from the at least one first charging station via the network, wherein the first charging status information comprises at least a charging time or a charging power which is charged by the electric vehicle. The server determines whether the first charging status information corresponding to the first charging operation meets an energy management condition. When the first charging status information corresponding to the first charging operation meets the energy management condition, the server selects at least one second charging station from the candidate charging stations according to the candidate charging requests, and instructs the second charging station to perform a second charging operation, wherein the at least one second charging station uses the upper power limit value as the target power parameter value to output power to an electric vehicle in the second charging operation.

In some embodiments, the server further selects the at least one first charging station from the candidate charging stations according to a power limit of the charging field, the upper power limit value, and a time sequence of receiving each of the candidate charging requests.

In some embodiments, the server further searches a database according to a candidate user ID in each of the candidate charging requests to obtain a membership type corresponding to a candidate user of each of the candidate charging requests, and selects the at least one first charging station from the candidate charging stations according to a power limit of the charging field, the upper power limit value, and the membership type of the candidate user corresponding to each of the candidate charging requests.

In some embodiments, the server determines whether the charging power corresponding to the first charging operation reaches a predetermined power to determine whether the first charging status information corresponding to the first charging operation meets the energy management condition.

In some embodiments, the server determines whether the first charging status information corresponding to the first charging operation indicates that the first charging operation has been completed, so as to determine whether the first charging status information corresponding to the first charging operation meets the energy management condition.

In some embodiments, the at least one second charging station comprises one of the at least one first charging station.

Electric vehicle charging management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
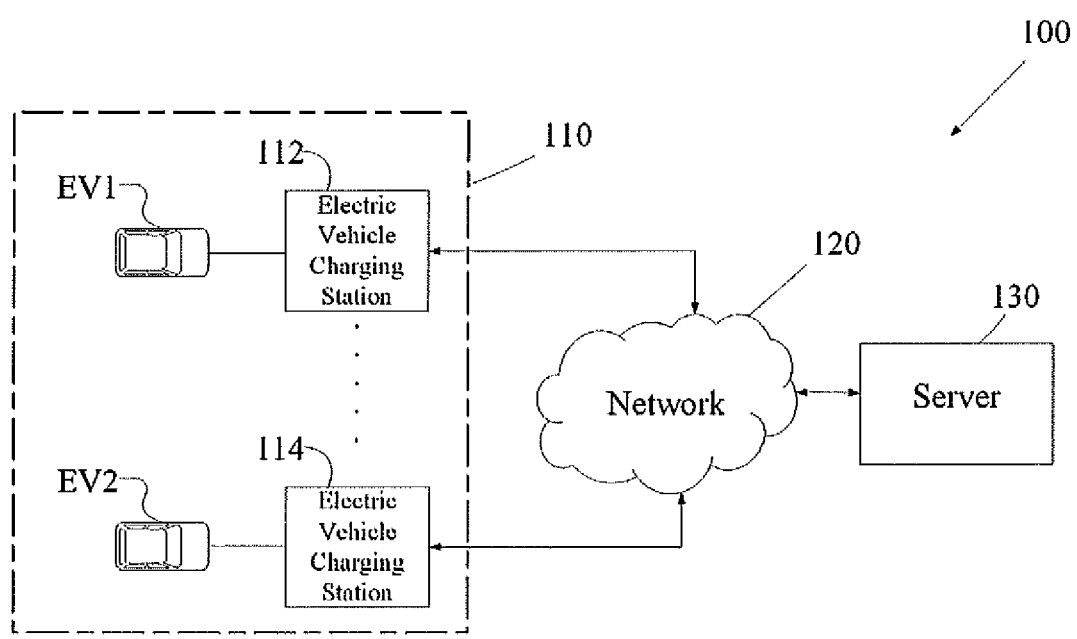
FIG. 1 is a schematic diagram illustrating an embodiment of an electric vehicle charging management system of the invention.

FIG. 1 is a schematic diagram illustrating an embodiment of an electric vehicle charging management system of the invention. The electric vehicle charging management system 100 can be used in a charging filed 110 with a plurality of electric vehicle charging stations. It is noted that, the charging filed 110 has a power limitation. As shown in FIG. 1, the electric vehicle charging management system 100 comprises a plurality of electric vehicle charging stations (112, 114), and a server 130 respectively connected with the respective electric vehicle charging stations via a network 120. The respective charging stations can provide electric vehicles (EV1, EV2) for charging operations. In some embodiments, the network 120 may be a wired network, a telecommunication network, and a wireless network, such as a Wi-Fi network. The server 130 can receive various data from the respective electric vehicle charging stations via the network 120, and transmit related signals to the respective electric vehicle charging stations. The respective electric vehicle charging stations can perform related operations according to the signals received from the server 130. For example, when the electric vehicle EV1 is coupled to the electric vehicle charging station 112 through a charging gum of the electric vehicle charging station 112 for a charging operation, the electric vehicle charging station 112 can continuously transmit charging information corresponding the charging operation of the electric vehicle EV1 via the network 120, and the server 130 can receive the charging information of the corresponding charging operation from the electric vehicle charging station 112 via the network 120. Similarly, when the electric vehicle EV2 is coupled to the electric vehicle charging station 114 through a charging gun of the electric vehicle charging station 114 to perform a charging operation, the electric vehicle charging station 114 can continuously transmit the charging information corresponding the charging operation of the electric vehicle EV2 via the network 120, and the server 130 can receive the charging information of the corresponding charging operation from the electric vehicle charging station 114 via the network 120.

It is noted that the user can connect the electric vehicle EV1 and the electric vehicle charging station 112 to each other, such as inserting a charging gun into the charging port of the electric vehicle to send a charging request corresponding to the electric vehicle charging station 112 to use the electric vehicle charging station 112. The electric vehicle charging station 112 performs a charging operation for the electric vehicle EV1. Similarly, the user can connect the electric vehicle EV2 and de electric vehicle charging station 114 to each other, such as inserting a charging gun into the charging port of the electric vehicle to send a charging request corresponding to the electric vehicle charging station 114 to use the electric vehicle charging station 114. It is understood that, in some embodiments, the server 130 may directly or indirectly receive a charging request from a mobile device (not shown in FIG. 1) of the owner of the electric vehicle EV1, and generate a charging authorization command based on the charging request and transmit it to the electric vehicle charging station 112 via the network 120, so that the electric vehicle charging station 112 outputs power to the electric vehicle EV1, such as an electric scooter or an electric car, which is electrically connected to it, or prohibits the electric vehicle charging station 112 from outputting power to the electric vehicle EV1. It is reminded that, in some embodiments, the charging request may be accompanied by an identity authentication and/or a payment mechanism, and the charging authorization command will only be generated after the identity authentication and/or payment mechanism is completed. In some embodiments, the user of the electric vehicle EV1 can use his/her mobile device to download and install an application to generate a charging request through the user interface of the application. In some embodiments, the user can scan a Quick Response Code (QR code) on the electric vehicle charging station 112 through the scanning function of the application to generate the above-mentioned charging request, thereby starting a charging operation. In some embodiments, the user can select a specific charging station through the application and execute an activation function to generate the above-mentioned charging request, thereby starting a charging operation. It is understood that, in some embodiments, the owner of the electric vehicle EV1 can use an RFID card to approach an induction area (not shown in FIG. 1) on the electric vehicle charging station 112 to generate a corresponding charging request, and sent it to the server 130 via the network 120. It is reminded that, in some embodiments, each user can have an RFID card.

It is noted that, the device corresponding to the owner of the electric vehicle can be any electronic device capable of Internet access, such as mobile devices, such as mobile phones, smart phones, personal digital assistants, global positioning systems, and notebook computers. In some embodiments, the mobile device can receive status information and notifications of the corresponding charging operation from the cloud management server 130 via the network 120. In some embodiments, the status information and notification may include notifying that the electric vehicle has stopped charging, notifying that the vehicle needed to be moved, and/or notifying that the charging gun of the electric vehicle charging device has been disconnected from the electric vehicle, and so on.

As mentioned above, the charging field 110 has a power limit. The server 130 can perform a load adjustment operation for the electric vehicle charging stations in the charging field 110. Specifically, the server 130 can generate an instruction and send the instruction to the charging station (112, 114) via the network 120 to control the charging station to output power for charging with a specified power parameter, such as a specified amperage, during a specific period of time to the electric vehicle connected to the station, or to prohibit the charging station from outputting power to the electric vehicle. The details of the load adjustment operation will be described later.

Figure 2:
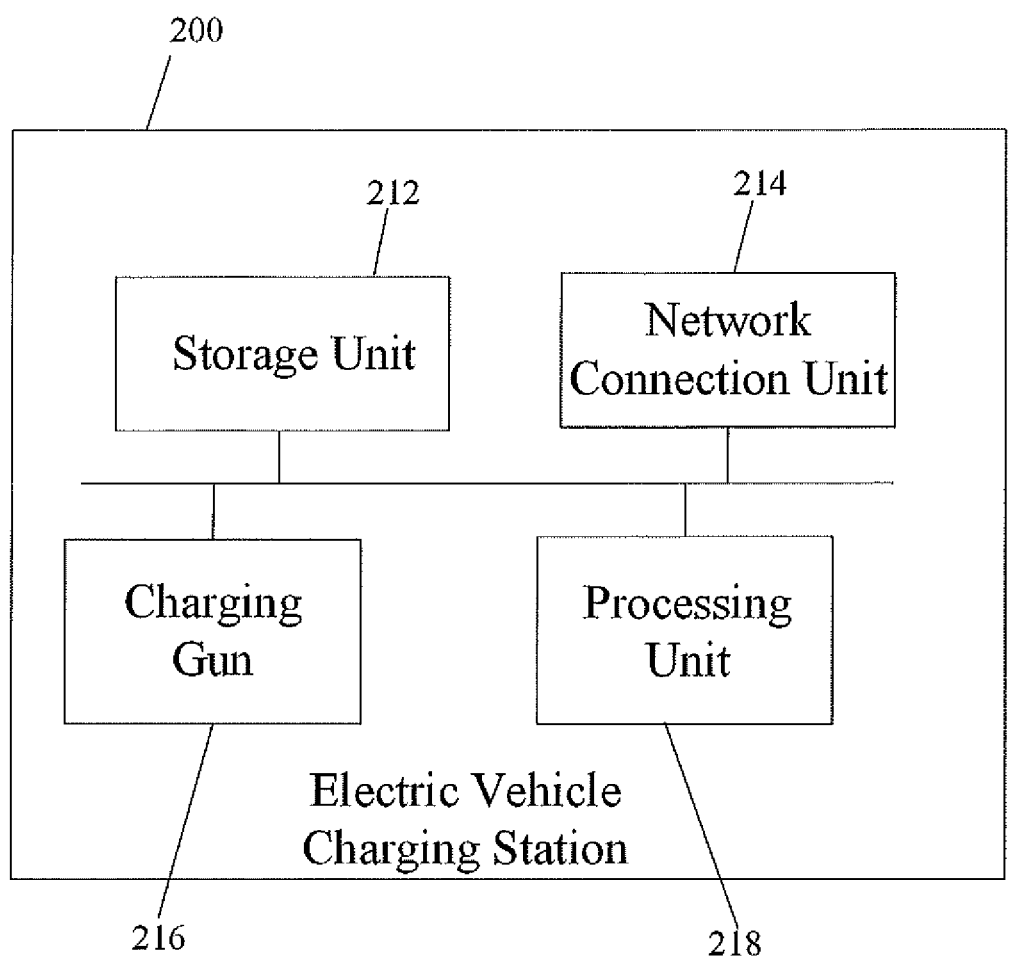
FIG. 2 is a schematic diagram illustrating an embodiment of an electric vehicle charging station of the invention.

FIG. 2 is a schematic diagram illustrating an embodiment of an electric vehicle charging station of the invention. The electric vehicle charging station 200 shown in FIG. 2 can be applied to the electric vehicle charging stations (112, 114) in FIG. 1, which has processing and computing capabilities to perform charging management operations for the electric vehicle charging station 200. The electric vehicle charging station 200 has a network connection capability to receive, download or update various parameters and information required for charging management calculations.

The electric vehicle charging station 200 at least comprises a storage unit 212, a network connection unit 214, a charging gun 216, and a processing unit 218. The storage unit 212 may be a memory or a database for storing and recording related data. The data may be related information such as charging station ID of the electric vehicle charging station and charging requests. It should be noted that the aforementioned information is only example, and the invention is not limited thereto. The network connection unit 214 can use a network, such as a wired network, a telecommunications network, and a wireless network, such as a Wi-Fi network, to receive, download, or update various parameters and information required for charging management operations. The charging gun 216 may include one or more charging connectors that meet the same charging interface specification or meet different charging interface specifications, and are electrically connected to the corresponding electric vehicle. The processing unit 218 can control the operations of related software and hardware in the electric vehicle charging station 200, and cooperate with the server 130 to execute the electric vehicle charging management methods of the invention. Related details will be described later. It is noted that, in some embodiments, the processing unit 218 may be a general-purpose controller, a Micro-Control Unit, MCU, or a Digital Signal Processor, DSP, etc., to provide functions of data analysis, processing and calculation, but the present invention is not limited to this. In one embodiment, the processing unit 216 may use the network connection unit 214 to transmit the power state of the corresponding electric vehicle through a network for a cloud management server, such as the cloud server 130, for subsequent charging management. In another embodiment, the processing unit 216 can obtain the power parameter of a charging operation from the server 130, determine the output power according to the power parameter received from the server 130, and output the power to at least one electric vehicle through the charging gun 216 to perform the charging operation. It is noted that, in some embodiments, the electric vehicle charging station 200 may comprise an RFID reading unit for sensing information of an RFID card, such as a user ID code of an electric vehicle owner.

It is understood that, the electric vehicle charging station 200 has an upper power limit value and a lower power limit value. Specifically, the electric vehicle charging station 200 can use the upper power limit value as the power parameter at the highest to output power to the electric vehicle during a charging operation. On the other hand, the electric vehicle charging station 200 needs to use the lower power limit value as the power parameter at least to output power to the electric vehicle during a charging operation. It must be noted that, charging stations of different brands and models may have different upper power limit values for output power and lower power limit values for output power. The present invention is not limited to any value, and the value may be different for different charging stations.

Figure 3:
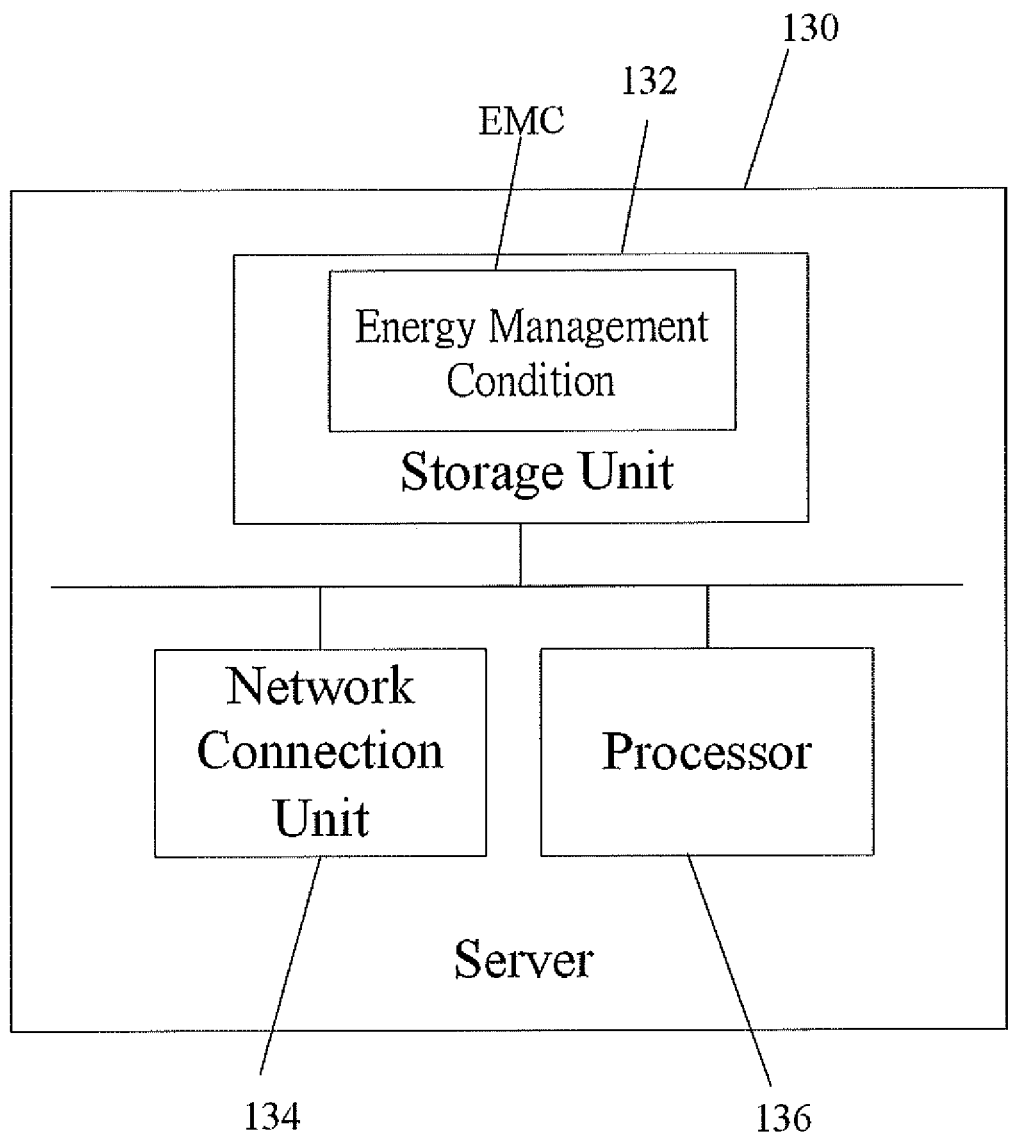
FIG. 3 is a schematic diagram illustrating an embodiment of a server of the invention.

FIG. 3 is a schematic diagram illustrating an embodiment of a server of the invention. As shown in FIG. 3, the server 130 of the invention can be any processor-based electronic device, which comprises at least a storage unit 132, a network connection unit 134, and a processor 136. It is noted that, the server 130 can receive various data corresponding to a plurality of electric vehicle charging stations in a charging field. The server 130 can directly or indirectly receive a charging request from a mobile device, and after completing actions such as identity confirmation in response to the charging request, generate a charging authorization command and transmit it to the corresponding electric vehicle charging station via the network. In response to the charging authorization command, the electric vehicle charging station is allowed to output power to an electric vehicle (for example, an electric motorcycle or an electric vehicle, etc.) that is electrically connected to it, or prohibit the electric vehicle charging station from outputting power to the electric vehicle.

The storage unit 132 may be a memory, which can store and record related data, such as various data of the electric vehicle charging stations. It is noted that, the storage unit 132 may include at least one energy management condition EMC. The energy management condition EMC records a judgment logic, and when the energy management condition EMC is met, a selection for electric vehicle charging stations can be executed. The details will be discussed later. In addition, in some embodiments, the storage unit 132 may record at least one energy management scheme, which records the power distribution logic of a load adjustment operation performed by the charging field to control the charging operations corresponding to the respective electric vehicle charging stations. It is noted that, the power distribution logic is configured to determine the execution order and the target power parameter value for the respective charging requests (charging operations) of the corresponding charging stations under the power limitation of the charging field. It must be noted that, in the invention, the target power parameter value when the charging request is executed is set as the upper power limit value of the electric vehicle charging station 200. The target power parameter value will not be adjusted during the load adjustment operation. It is understood that, in some embodiments, the storage unit 132 may comprise a database (not shown in FIG. 3) for recording the membership types of individual charging users corresponding to different charging fields. In addition, in some embodiments, the storage unit 132 may include a time setting table for setting at least one peak period and an off-peak period. Through the network connection unit 134, the server 130 can be coupled to and communicates with the electric vehicle charging stations (112, 114) via the network 120, such as a wired network, a telecommunications network, and a wireless network, such as a Wi-Fi network, and transmits related data/signals/commands to different electric vehicle charging stations via the network 120 to control whether the electric vehicle charging stations output power, and specify power parameters for outputting power to electric vehicles. The processor 136 can control the operations of related software and hardware in the server 130, and execute the electric vehicle charging management methods of the invention. The relevant details will be described later. It is reminded that, when there are multiple energy management schemes in the server, the processor 136 can select one of the energy management schemes, and perform a load adjustment operation for the charging field according to the selected energy management scheme. It is understood that, in some embodiments, the processor 136 may be a general-purpose controller, a Micro-Control Unit, MCU, or a Digital Signal Processor, DSP, etc., to provide data analysis, processing, and calculation functions.

Figure 4:
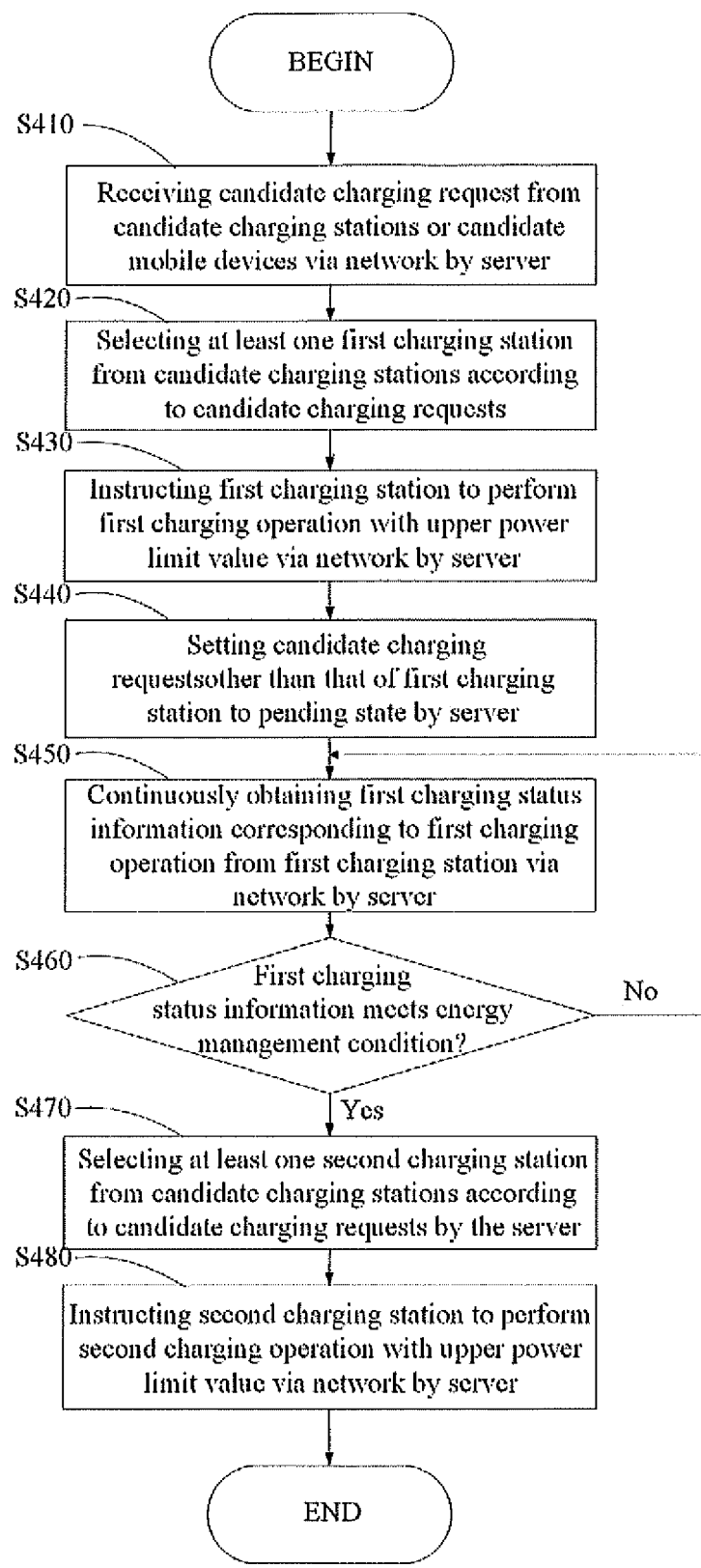
FIG. 4 is a flowchart of an embodiment of an electric vehicle charging management method of the invention.

FIG. 4 is a flowchart of an embodiment of an electric vehicle charging management method of the invention. The electric vehicle charging management method of the invention is applicable to a charging field with a plurality of electric vehicle charging stations, and the charging field has a power limit. The respective electric vehicle charging station in the charging field can be electrically coupled with a remote server via a network.

In step S410, the server respectively receives a candidate charging request from a plurality of candidate charging stations among the electric vehicle charging stations or a plurality of candidate mobile devices via the network. It is noted that, not all electric vehicle charging stations will receive charging requests at the same time. In some embodiments, the user may connect the electric vehicle and the electric vehicle charging station to each other, such as inserting a charging gun into the charging interface of the electric vehicle, to send a charging request corresponding to the electric vehicle charging station. In some embodiments, the server may directly or indirectly receive the charging request from the mobile device of the corresponding electric vehicle owner. It is noted that, in some embodiments, the user can use the scanning function of the application in the mobile device to scan an QR code on the electric vehicle charging station to generate the above-mentioned charging request. In some embodiments, the user can use an application in the mobile device to select an electric vehicle charging station and execute an activation function to generate the above-mentioned charging request. In some embodiments, the owner of an electric vehicle can use an RFID card to approach the induction area on the electric vehicle charging station to generate a corresponding charging request. In step S420, according to the candidate charging requests, the server selects at least one first charging station from the candidate charging stations, and in step S430, instructs the at least one first charging station to perform a first charging operation via the network. It is understood that, the at least one first charging station has an upper power limit value, and the at least one first charging station uses the upper power limit value as a target power parameter value to output power to an electric vehicle during the first charging operation. It is reminded that, after the target power parameter value is set for the electric vehicle charging station, the electric vehicle charging station will output power to the electric vehicle for charging according to the target power parameter value in the corresponding charging operation. In other words, the power output by the electric vehicle charging station will not be greater than the target power parameter value. It should be noted that, the number of the at least one first charging station can be determined according to the needs of different charging fields, and the method of selecting the at least one first charging station can be determined according to different energy management schemes. The invention is not limited to any schemes. After the at least one first charging station is determined, in step S440, the server sets the candidate charging requests corresponding to the candidate charging station other than the at least one first charging station into a pending state. In other words, at this stage, the charging request corresponding to the at least one first charging station will be processed first, and the charging requests of other candidate charging stations will be temporarily put on hold. In step S450, the server continuously obtains the first charging status information of the corresponding first charging operation from the at least one first charging station via the network. It should be noted that, the first charging status information may include at least a charging time and/or a charging power. In step S460, the server determines whether the first charging status information corresponding to the first charging operation meets an energy management condition. When the first charging status information corresponding to the first charging operation does not meet the energy management condition (No in step S460), the process returns to step S450. When the first charging status information corresponding to the first charging operation meets the energy management condition (Yes in step S460), in step S470, the server selects at least one second charging station from the candidate charging stations according to the candidate charging requests, and in step S480, instructs the at least one second charging station to perform a second charging operation via the network. It is understood that, in some embodiments, the at least one second charging station may include one of the at least one first charging station. In other words, the at least one second charging station and the at least one first charging station may overlap in whole or in part. In some embodiments, the at least one second charging station and the at least one first charging station are different. It is noted that, the at least one second charging station uses its upper power limit value as the target power parameter value to output power to the electric vehicle during the second charging operation. Similarly, after the target power parameter value is set for the electric vehicle charging station, the electric vehicle charging station will output power to the electric vehicle for charging according to the target power parameter value in the corresponding charging operation. In other words, the power output by the electric vehicle charging station will not be greater than the target power parameter value.

Figure 5:
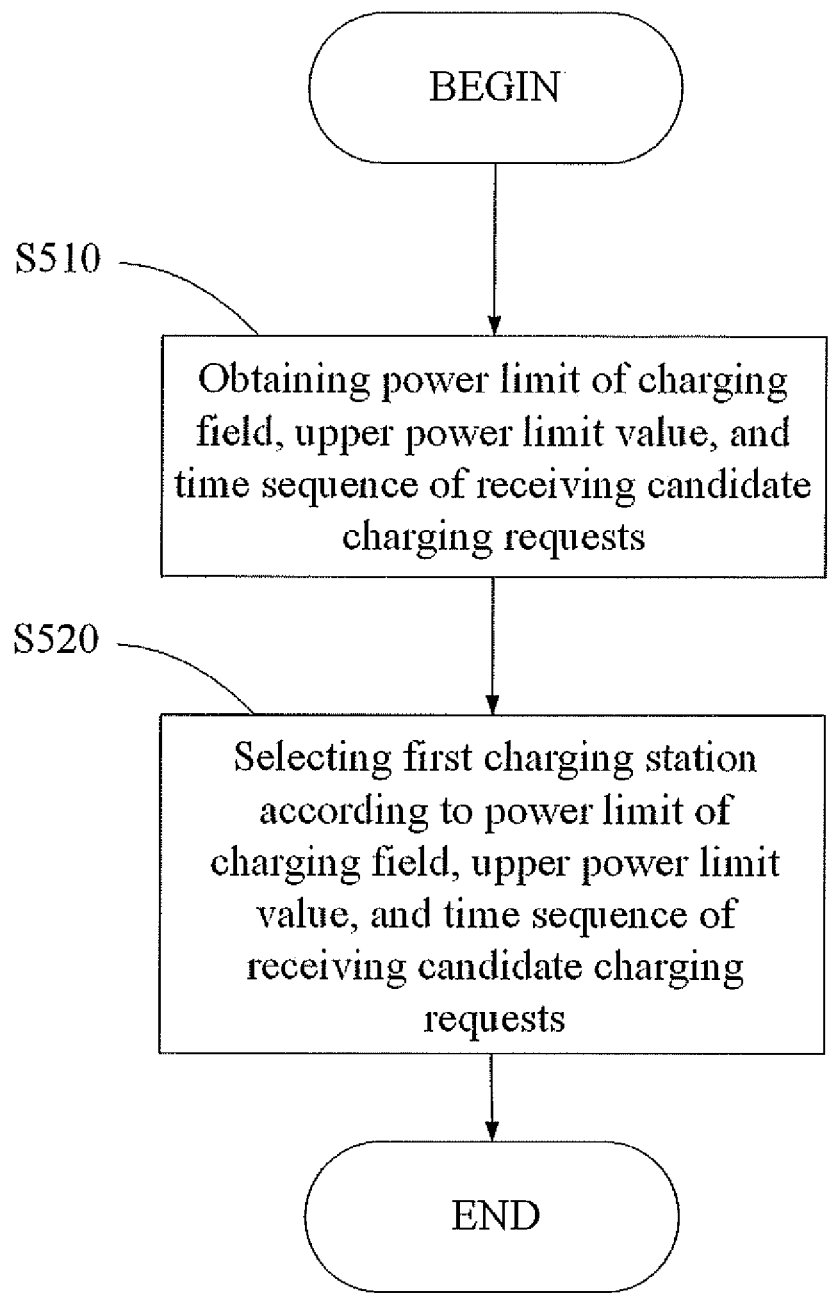
FIG. 5 is a flowchart of an embodiment of a method for selecting electric vehicle charging stations of the invention.

FIG. 5 is a flowchart of an embodiment of a method for selecting electric vehicle charging stations of the invention. The method for selecting electric vehicle charging stations is applicable to a charging field with a plurality of electric vehicle charging stations, and the charging field has a power limit. The respective electric vehicle charging station in the charging field can be electrically coupled with a remote server via a network.

In step S510, a power limit corresponding to the charging field, the upper power limit value of the respective electric vehicle charging station, and a time sequence of receiving each of the candidate charging requests are obtained. Then, in step S520, the at least one first charging station is selected from the candidate charging stations according to the power limit of the charging field, the upper power limit value of the respective electric vehicle charging station, and the time sequence of receiving each of the candidate charging requests. As mentioned above, the number of the at least one first charging station can be determined according to the requirements of different charging fields.

Figure 6:
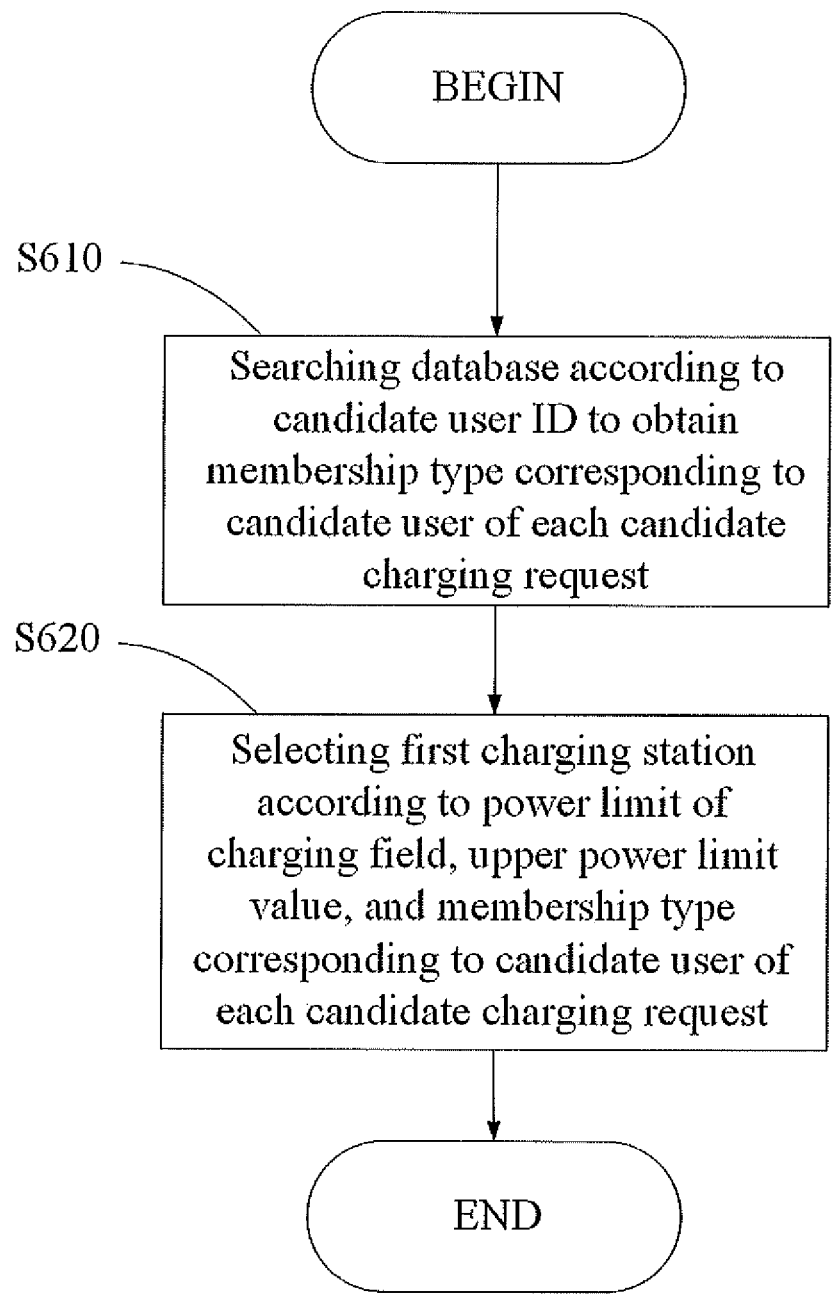
FIG. 6 is a flowchart of another embodiment of a method for selecting electric vehicle charging stations of the invention.

FIG. 6 is a flowchart of another embodiment of a method for selecting electric vehicle charging stations of the invention. The method for selecting electric vehicle charging stations is applicable to a charging field with a plurality of electric vehicle charging stations, and the charging field has a power limit. The respective electric vehicle charging station in the charging field can be electrically coupled with a remote server via a network.

In step S610, a database is searched according to a candidate user ID code in each candidate charging request to obtain a membership type of a candidate user corresponding to each candidate charging request. It should be noted that, the charging request may include at least the charging station ID code corresponding to the electric vehicle charging station and the user ID code corresponding to the electric vehicle user. The database in the server can record the membership types of individual charging users corresponding to different charging fields. In step S620, at least one first charging station is selected from the candidate charging stations according to the power limit of the charging field, the upper power limit value of the respective electric vehicle charging station, and the membership type of the candidate user corresponding to each candidate charging request. As mentioned above, the number of the at least one first charging station can be determined according to the requirements of different charging fields. In some examples, the membership types may have multiple levels, and the higher-level members can be preferentially selected.

Figure 7:
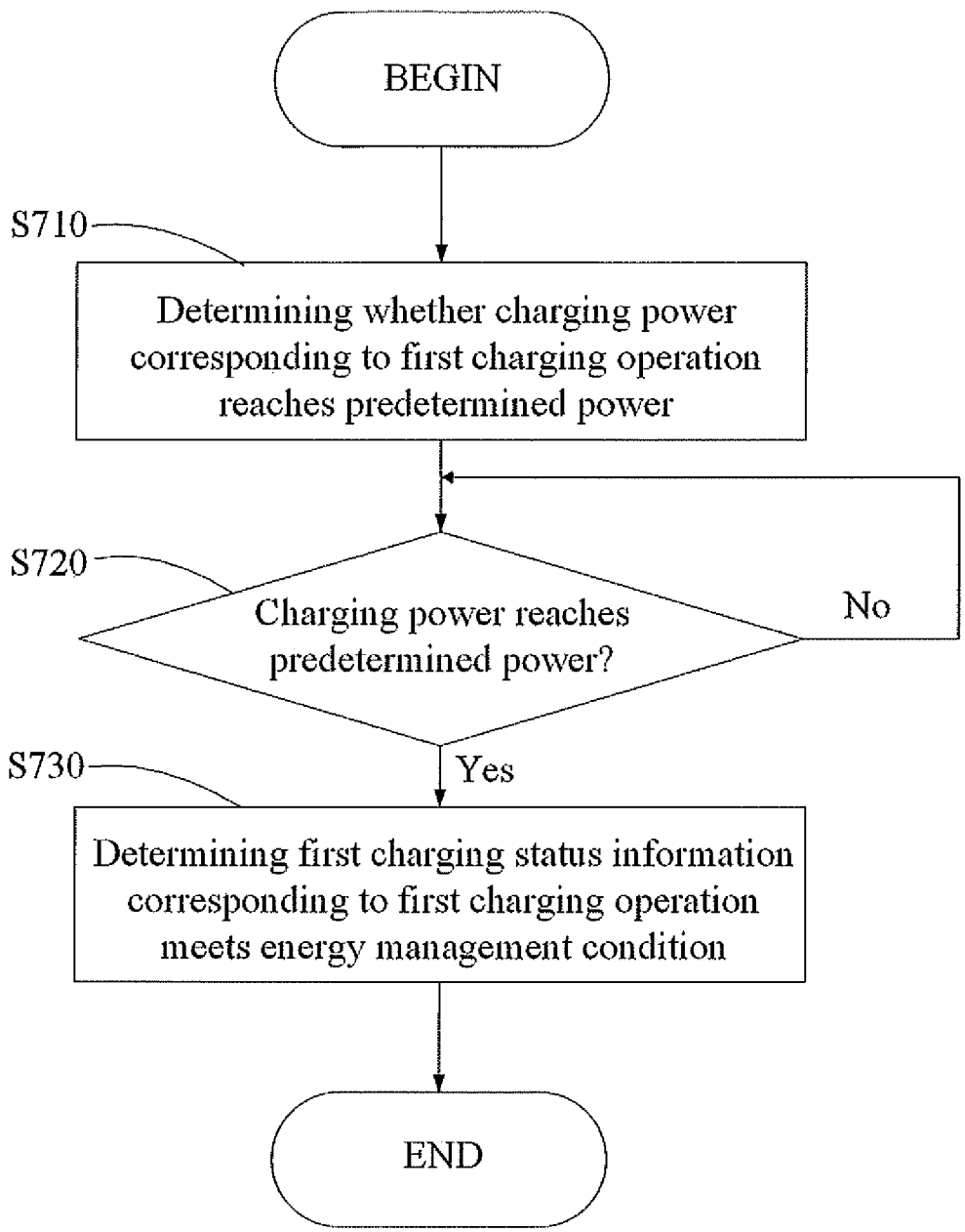
FIG. 7 is a flowchart of an embodiment of a method for determining whether an energy management condition is met of the invention.

FIG. 7 is a flowchart of an embodiment of a method for determining whether an energy management condition is met of the invention. In this embodiment, the server can determine whether the energy management condition is met according to the charging state.

In step S710, the server determines whether the charging power corresponding to the first charging operation reaches a predetermined power. It is understood that, in some embodiments of energy management schemes, the charging field can promise that the electric vehicle will surely be allowed to replenish a predetermined amount of power, such as 20 kW, during each charging operation. Than, the corresponding charging request will be participated in subsequent load adjustment operations when the charging power of the electric vehicle reaches the predetermined power. When the charging power corresponding to the first charging operation does not reach the predetermined power (No in step S720), the determination in step S720 is continued. When the charging power of the corresponding first charging operation reaches the predetermined power (Yes in step S720), in step S730, the server determines that the first charging status information of the corresponding first charging operation has met the energy management condition.

Figure 8:
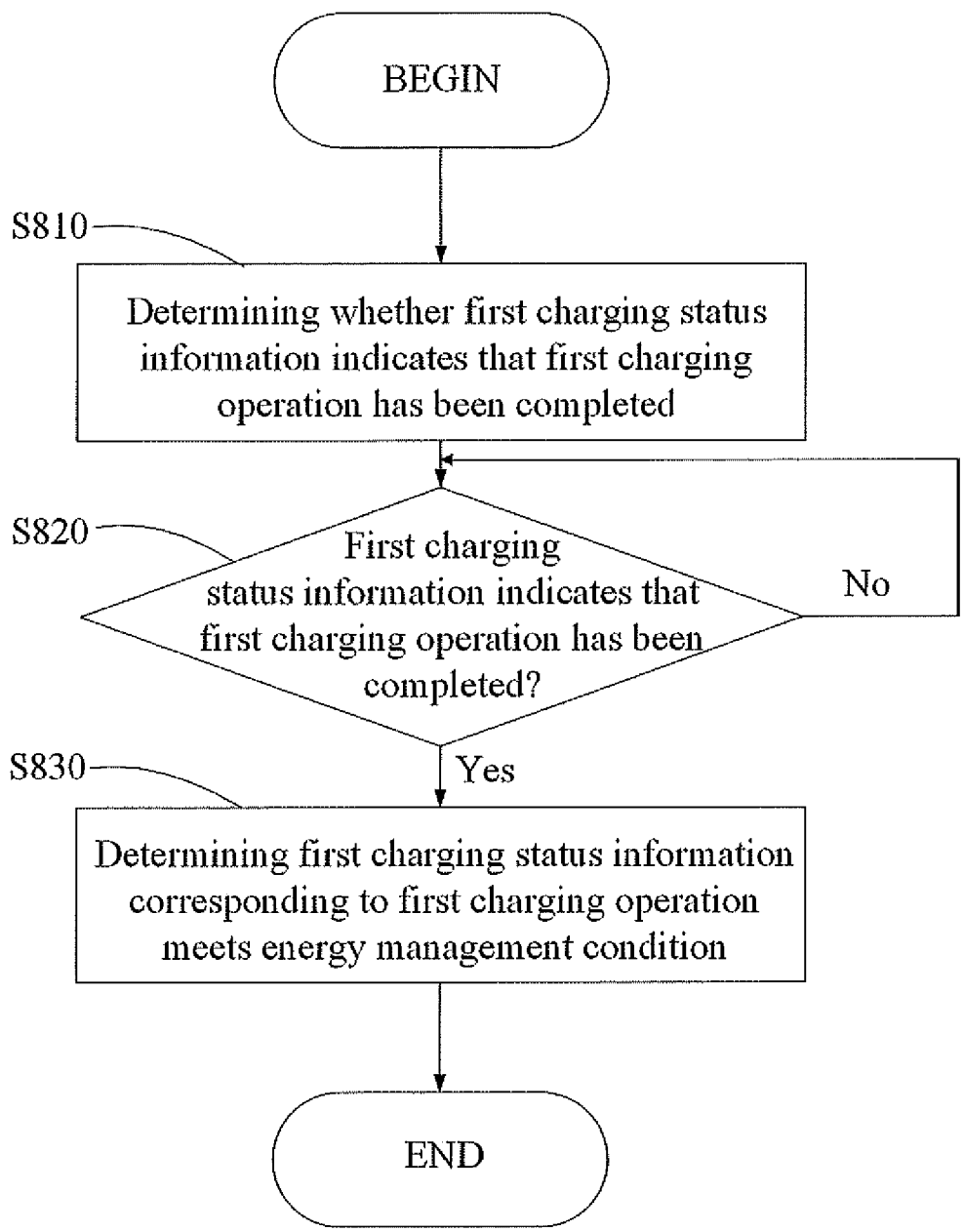
FIG. 8 is a flowchart of another embodiment of a method for determining whether an energy management condition is met of the invention.

FIG. 8 is a flowchart of another embodiment of a method for determining whether an energy management condition is met of the invention. In this embodiment, the server can determine whether the energy management condition is met based on the charging status.

First, in step S810, the server determines whether the first charging status information corresponding to the first charging operation indicates that the charging has been completed. When the first charging status information corresponding to the first charging operation indicates that the charging has not been completed (No in step S820), the determination in step S820 is continued. When the first charging status information of the corresponding first charging operation indicates that the charging has been completed (Yes in step S820), in step S830, the server determines that the first charging status information of the corresponding first charging operation has met the energy management condition.

It is noted that, the method for determining the charging stations and the method for determining whether the charging status information meets the energy management condition are only examples, and the present invention is not limited thereto. The method of determining the charging stations and the method of determining whether the charging status information meets the energy management condition can be determined according to the requirements of different charging fields and the energy management schemes for load adjustment operations. Therefore, the electric vehicle charging management methods and systems of the invention can allocate energy for the electric vehicle charging stations in the charging field, and in the load adjustment operation, the electric vehicle charging stations are instructed to perform the charging operation according to its upper power limit value, which further increases the flexibility of load adjustment operations in respective charging fields.

Electric vehicle charging management methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An electric vehicle charging management method for use in a charging field with a plurality of electric vehicle charging stations and the electric vehicle charging stations are connected to a server through a network, comprising:
   receiving a candidate charging request respectively from each of a plurality of candidate charging stations among the electric vehicle charging stations or candidate mobile devices via the network by the server;
   selecting at least one first charging station from the candidate charging stations according to the candidate charging requests;
   instructing the first charging station to perform a first charging operation via the network by the server, wherein the at least one first charging station has an upper power limit value, and the at least one first charging station uses the upper power limit value as a target power parameter value to output power to an electric vehicle in the first charging operation;
   setting the candidate charging requests of the candidate charging stations other than that of the first charging station to a pending state by the server;
   continuously obtaining first charging status information corresponding to the first charging operation from the at least one first charging station via the network by the server, wherein the first charging status information comprises at least a charging time or a charging power which is charged by the electric vehicle;
   determining whether the first charging status information corresponding to the first charging operation meets an energy management condition by the server;
   selecting at least one second charging station from the candidate charging stations according to the candidate charging requests by the server when the first charging status information corresponding to the first charging operation meets the energy management condition; and
   instructing the second charging station to perform a second charging operation via the network by the server, wherein the at least one second charging station uses the upper power limit value as the target power parameter value to output power to an electric vehicle in the second charging operation.

2. The method of claim 1, further comprising selecting the at least one first charging station from the candidate charging stations according to a power limit of the charging field, the upper power limit value, and a time sequence of receiving each of the candidate charging requests.

3. The method of claim 1, further comprising:
   searching a database according to a candidate user ID in each of the candidate charging requests to obtain a membership type corresponding to a candidate user of each of the candidate charging requests; and
   selecting the at least one first charging station from the candidate charging stations according to a power limit of the charging field, the upper power limit value, and the membership type of the candidate user corresponding to each of the candidate charging requests.

4. The method of claim 1, wherein the server determines whether the charging power corresponding to the first charging operation reaches a predetermined power to determine whether the first charging status information corresponding to the first charging operation meets the energy management condition.

5. The method of claim 1, wherein the server determines whether the first charging status information corresponding to the first charging operation indicates that the first charging operation has been completed, so as to determine whether the first charging status information corresponding to the first charging operation meets the energy management condition.

6. The method of claim 1, wherein the at least one second charging station comprises one of the at least one first charging station.

7. An electric vehicle charging management system for use in a charging field, comprising:
   a plurality of electric vehicle charging stations, wherein each of the electric vehicle charging stations has a network connection capability; and
   a server receiving a candidate charging request respectively from each of a plurality of candidate charging stations among the electric vehicle charging stations or candidate mobile devices via the network by the server, selecting at least one first charging station from the candidate charging stations according to the candidate charging requests, instructing the first charging station to perform a first charging operation via the network by the server, wherein the at least one first charging station has an upper power limit value, and the at least one first charging station uses the upper power limit value as a target power parameter value to output power to an electric vehicle in the first charging operation, setting the candidate charging requests of the candidate charging stations other than that of the first charging station to a pending state by the server, continuously obtaining first charging status information corresponding to the first charging operation from the at least one first charging station via the network by the server, wherein the first charging status information comprises at least a charging time or a charging power which is charged by the electric vehicle, determining whether the first charging status information corresponding to the first charging operation meets an energy management condition by the server, selecting at least one second charging station from the candidate charging stations according to the candidate charging requests by the server when the first charging status information corresponding to the first charging operation meets the energy management condition, and instructing the second charging station to perform a second charging operation via the network by the server, wherein the at least one second charging station uses the upper power limit value as the target power parameter value to output power to an electric vehicle in the second charging operation.

8. The system of claim 7, wherein the server further selects the at least one first charging station from the candidate charging stations according to a power limit of the charging field, the upper power limit value, and a time sequence of receiving each of the candidate charging requests.

9. The system of claim 7, wherein the server further searches a database according to a candidate user ID in each of the candidate charging requests to obtain a membership type corresponding to a candidate user of each of the candidate charging requests, and selects the at least one first charging station from the candidate charging stations according to a power limit of the charging field, the upper power limit value, and the membership type of the candidate user corresponding to each of the candidate charging requests.

10. The system of claim 7, wherein the server determines whether the charging power corresponding to the first charging operation reaches a predetermined power to determine whether the first charging status information corresponding to the first charging operation meets the energy management condition.

11. The system of claim 7, wherein the server determines whether the first charging status information corresponding to the first charging operation indicates that the first charging operation has been completed, so as to determine whether the first charging status information corresponding to the first charging operation meets the energy management condition.

12. The system of claim 7, wherein the at least one second charging station comprises one of the at least one first charging station.

13. A machine-readable storage medium comprising a computer program, which, when executed, causes a device to perform an electric vehicle charging management method for use in a charging field with a plurality of electric vehicle charging stations and the electric vehicle charging stations are connected to a server through a network, wherein the method comprises:

receiving a candidate charging request respectively from each of a plurality of candidate charging stations or candidate mobile devices via the network by the server;

selecting at least one first charging station from the candidate charging stations according to the candidate charging requests;

instructing the first charging station to perform a first charging operation via the network by the server, wherein the at least one first charging station has an upper power limit value, and the at least one first charging station uses the upper power limit value as a target power parameter value to output power to an electric vehicle in the first charging operation;

setting the candidate charging requests of the candidate charging stations other than that of the first charging station to a pending state by the server;

continuously obtaining first charging status information corresponding to the first charging operation from the at least one first charging station via the network by the server, wherein the first charging status information comprises at least a charging time or a charging power which is charged by the electric vehicle;

determining whether the first charging status information corresponding to the first charging operation meets an energy management condition by the server;

selecting at least one second charging station from the candidate charging stations according to the candidate charging requests by the server when the first charging status information corresponding to the first charging operation meets the energy management condition; and instructing the second charging station to perform a second charging operation via the network by the server, wherein the at least one second charging station uses the upper power limit value as the target power parameter value to output power to an electric vehicle in the second charging operation.

* * * * *